United States Patent [19]

Barnes

[11] 4,122,370

[45] Oct. 24, 1978

[54] CATHODE RAY TUBE CONTAINING A MANGANESE ACTIVATED RARE EARTH FLUORIDE LUMINESCENT MATERIAL

[75] Inventor: Roderick Gordon Lester Barnes, Royston, England

[73] Assignee: Johnson, Matthey & Co., Limited, London, England

[21] Appl. No.: 829,502

[22] Filed: Aug. 31, 1977

[30] Foreign Application Priority Data

Feb. 9, 1976 [GB] United Kingdom ............... 36401/76
Jan. 19, 1977 [GB] United Kingdom ................ 2108/77

[51] Int. Cl.$^2$ ..................... C09K 11/46; H01J 29/20
[52] U.S. Cl. ........................... 313/468; 252/301.4 H; 252/301.4 F
[58] Field of Search ................ 252/301.4 H, 301.4 F; 313/468

[56] References Cited

U.S. PATENT DOCUMENTS

| | | | |
|---|---|---|---|
| 2,746,933 | 5/1956 | Smith | 252/301.4 H |
| 3,693,006 | 9/1972 | Chenot | 252/301.4 H X |

OTHER PUBLICATIONS

Starosina et al., "Fiz Tverd. Tela", 1972, 14(12), pp. 3480–3483.
Margaryan et al., "Chem. Abstracts", vol. 83, 1975, 50277e.
Matsubara, "Mat. Res. Bull.", vol. 7, 1972, pp. 963–970.
Ginther, "J. Electrochem. Soc.," vol. 101, No. 5, 1954.

*Primary Examiner*—Jack Cooper
*Attorney, Agent, or Firm*—Cushman, Darby & Cushman

[57] ABSTRACT

A luminescent material comprising a rare earth fluoride host activated with manganese. The material also may include another element such as titanium or zirconium. The material may be used as a coating on the face plate of a cathode ray tube.

1 Claim, No Drawings

CATHODE RAY TUBE CONTAINING A MANGANESE ACTIVATED RARE EARTH FLUORIDE LUMINESCENT MATERIAL

This invention relates to luminescent materials.

Luminescent materials, often known as "phosphors" or "phospor materials", are chemical compounds which, as a result of stimulation or excitation by electromagnetic radiation, often in the ultra-violet region of the spectrum or by a beam of cathode rays, emit light typically in the visible region of the spectrum. The exact chemical nature of a phosphor determines such characteristics as the wavelength of the emitted radiation and the length of time that emission continues after excitation has ceased.

Phosphors are particularly useful for coating the screens of cathode ray tubes and as such they find application in the television industry, for example. For some applications, radar being an example, it is desirable that the phosphor exhibits long persistence, that is to say, continues to emit visible radiation for a period of time varying from a few seconds to several minutes after excitation has ceased. A similar phosphor with a shorter persistence, for example several tenths of a second, would also find an application in general terms in, for example, an anti-flicker display.

For other applications, it is desirable that a phosphor exhibits predetermined persistence, as opposed to one which exhibits a defined minimum of emission time. For example, in short range radar, it is necessary to use a phosphor which renders the display clearly visible during the emission period but which fades off rapidly before the next consecutive scan.

It is also desirable that emitted light from phosphors falls in the green region of the spectrum, particularly over a band extending from the blue-green to the yellow-green regions. One reason for this is that the human eye is particularly sensitive to light in this wavelength band.

It is further desirable that phosphor materials should be capable of withstanding the excitation to which they are subjected. In other words, they should have good "burn resistance".

One phosphor which exhibits suitable persistance comprises a lattice of magnesium or zinc fluoride activated with manganese. Prior art phosphors of this type, however, tend to have an emission confined to the orange region of the spectrum.

It is an object of the present invention, therefore, to provide phosphors which exhibit predetermined or long persistence and which emit radiation predominantly in the green or yellow-green regions of the spectrum.

It is a further object of the present invention to provide phosphors which have improved resistance to burning.

According to one aspect of the invention, a luminescent material comprises a rare earth fluoride host activated with manganese.

By "rare earth" I mean one/or more elements selected from scandium, yttrium and those elements having an atomic number from 57-71 inclusive. Of these, we particularly prefer to use Sc, Y, La, Gd and/or Lu.

According to a second aspect of the invention, a luminescent material comprises a rare earth (as herein defined) fluoride host activated with manganese and one or more of titanium, zirconium, hafnium, cerium, silicon, germanium and tin.

Phosphors according to the invention may be represented by the general formula $REF_3:xMn,yM$ in which RE represents one or more rare earth elements as hereinbefore defined and M represents a coactivator comprising one or more of Ti,Zr,Hf,Ce,Si,Ge and Sn. Manganese and the co-activator, if present, are substituted for a minor amount of the rare earth element and an alternative formula is, therefore, $RE_{(1-x-y)}Mn_xM_yF_z$ where $x$ is typically between 0.001 and 0.05, and $y$ is represented by the expression: $0 \leq y \leq 0.1$; and $z$ is approximately equal to 3.

The following examples show the preparation of phosphors according to the invention

EXAMPLE 1

26.93g of scandium oxide are dissolved in about 200ml of moderately concentrated hydrocholoric acid. The solution is combined with a solution of manganese sulphate containing 0.108 of manganese, and is treated with a solution of ammonium carbonate until a small excess has been added, giving a pH of about 8. The resultant precipitate is digested, filtered off and washed, and is then treated with about 250ml of moderately dilute hydrofluoric acid. After evaporation to dryness, the product is treated with about 40ml of concentrated hydrofluoric acid and is again evaporated to dryness. This is then blended with about 4.5g of ammonium fluoride, and is fired in a closed platinum crucible at 900° C. for about half an hour to give a phosphor according to the first aspect of the invention with a nominal composition of $Sc_{0.995}Mn_{0.005}F_{2.995}$.

EXAMPLE 2

11.43g of yttrium oxide are dissolved in about 55ml of moderately concentrated hydrochloric acid. The solution is combined with a solution of manganese chloride containing 0.057g of manganese, and is treated with a solution of ammonium carbonate until a small excess has been added, giving a pH of about 8. The resultant precipitate is digested, filtered off and washed, and is then treated together with 0.050g of titanium with about 100ml of moderately dilute hydrofluoric acid. After evaporation is dryness, the product is treated with about 10ml of concentrated hydrofluoric acid and is again evaporated to dryness. This is then blended with about 1.5g of ammonium fluoride, and is fired in a closed platinum crucible at 850° for about half an hour to give a phosphor according to the second aspect of the invention with a nominal composition of $Y_{0.98}Mn_{0.01}Ti_{0.01}F_3$.

EXAMPLE 3

8.32g of scandium oxide and 5.88g of yttrium oxide are dissolved in 100ml of moderately concentrated hydrochloric acid. The solution is combined with a solution of manganese sulphate containing 0.048g of manganese, and is treated with a solution of ammonium carbonate until a small excess has been added, giving a pH of about 8. The resultant precipitate is digested, filtered off and washed, and is then treated with about 100ml of moderately dilute hydrofluoric acid. After evaporation to dryness, the product is treated with about 15ml of concentrated hydrofluoric acid and is again evaporated to dryness. This is then blended with about 2g of ammonium fluoride, and is fired in a closed platinum crucible at 850° C. for about 1 hour to give a phosphor according to the first aspect of the invention with a nominal composition of $Sc_{0.695}Y_{0.3}Mn_{0.005}F_{2.995}$.

Phosphors according to the invention may be applied, for example to the face-plate of a cathode ray tube, by methods known in the art. For example, an aqueous suspension of the phosphor, a binder such as potassium silicate and an inorganic electrolyte such as barium nitrate may be prepared so that the phosphor settles on and adheres to the substrate.

Phosphors according to the invention, when excited by a beam of cathode rays, fluoresce in the green or yellow-green region of the spectrum. Persistence is comparable to, and in many examples better than, prior art phosphors. Burn resistance is improved when titanium is used as a co-activator with manganese.

What I claim is:

1. A cathode ray tube including a face plate coated with a luminescent material comprising a rare earth fluoride host selected from Sc, Y, La, Gd and Lu flouride, activated with manganese and at least one of the elements titanium, zirconium, hafnium, cerium, silicon, germanium and tin, said material having the formula:

$RE_{(1-x-y)}F_3:xMn,yM$ in which RE represents one or more of Sc, Y, La, Gd and Lu, M represents at least one of Ti, Zr, Hf, Ce, Si, Ge and Sn, F is a fluoride, $x$ has a value between 0.001 and 0.05 and $y$ has a value $0 \leq y \leq 0.1$ said luminescent material emitting radiation predominantly in the green or yellow-green regions of the spectrum when excited by cathode rays.

* * * * *

UNITED STATES PATENT AND TRADEMARK OFFICE
CERTIFICATE OF CORRECTION

PATENT NO. : 4,122,370
DATED : October 24, 1978
INVENTOR(S) : Roderick Gordon Lester BARNES It is certified that error appears in the above-identified patent and that said Letters Patent are hereby corrected as shown below:

In the Heading of the Patent

Item [30] the filing date of UK application 36401/76 should read --September 2, 1976-- rather than

"Feb. 9, 1976"

Signed and Sealed this

Fourteenth Day of August 1979

[SEAL]

*Attest:*

*Attesting Officer*

LUTRELLE F. PARKER
*Acting Commissioner of Patents and Trademarks*